US008265335B2

(12) United States Patent
Hamada

(10) Patent No.: US 8,265,335 B2
(45) Date of Patent: Sep. 11, 2012

(54) IMAGE PROCESSING APPARATUS AND SCANNER APPARATUS

(75) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 451 days.

(21) Appl. No.: 12/690,451

(22) Filed: Jan. 20, 2010

(65) Prior Publication Data

US 2010/0202691 A1    Aug. 12, 2010

(30) Foreign Application Priority Data

Feb. 9, 2009 (JP) .................................. 2009-027073

(51) Int. Cl.
*G06K 9/00* (2006.01)
(52) U.S. Cl. ........ 382/100; 713/176; 235/454; 358/474; 348/195
(58) Field of Classification Search .................. 382/100, 382/312, 316, 317, 321; 235/454; 358/474–498; 713/176; 348/98, 195
See application file for complete search history.

(56) References Cited

U.S. PATENT DOCUMENTS

| 5,539,532 | A  | * | 7/1996  | Watanabe | ...................... | 358/443 |
| 7,120,798 | B2 | * | 10/2006 | Suisa    | ........................... | 713/176 |
| 7,222,235 | B1 |   | 5/2007  | Mitsui   |                          |         |
| 7,364,077 | B2 | * | 4/2008  | Wolf, II | ........................ | 235/454 |
| 2003/0005302 | A1 | * | 1/2003 | Searle | ........................... | 713/176 |
| 2003/0044043 | A1 |   | 3/2003 | Kaneda |                           |         |
| 2007/0174629 | A1 | * | 7/2007 | Suominen | ...................... | 713/182 |
| 2007/0229920 | A1 | * | 10/2007 | Fukushima | .................... | 358/488 |
| 2010/0046790 | A1 | * | 2/2010 | Koziol et al. | .................. | 382/100 |
| 2010/0141991 | A1 | * | 6/2010 | Yoshida et al. | ............... | 358/1.15 |
| 2011/0307701 | A1 | * | 12/2011 | Suominen | ...................... | 713/176 |

FOREIGN PATENT DOCUMENTS

| CN | 1404014 A    | 3/2003  |
| JP | 7-65108 A    | 3/1995  |
| JP | 10-232904 A  | 9/1998  |
| JP | 2000-287066 A | 10/2000 |
| JP | 2004-343523 A | 12/2004 |

* cited by examiner

*Primary Examiner* — Anand Bhatnagar
(74) *Attorney, Agent, or Firm* — Birch, Stewart, Kolasch & Birch, LLP

(57) ABSTRACT

In a multi-functional peripheral as an embodiment of the present invention, reading operation of an original is performed and form recognition processing is performed. Here, original image data is compared with form data held in advance and it is determined whether there is some that correspond to each other. In a case of not success in the form recognition, normal processing, that is, OCR processing is performed for entire region of original image data, and OCR result is embedded in the original image data as transparent character data. In a case of success in the form recognition, and further when there is a field in which protected attribute is set in the form data, embedding transparent character data for the protected attribute field is prohibited, and for only other region, embedding transparent character data is performed.

15 Claims, 10 Drawing Sheets

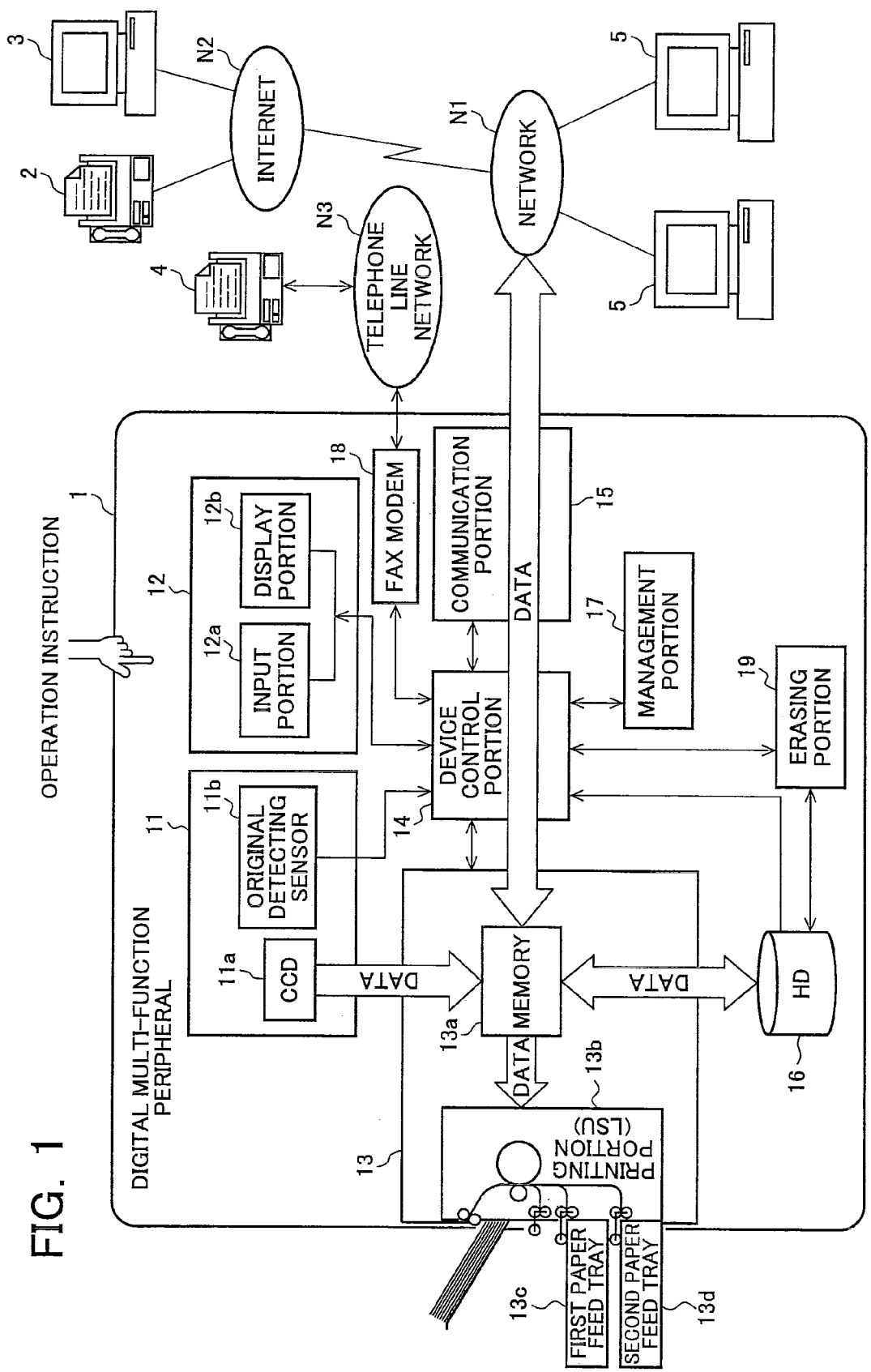

FIG. 2

| DEPARTMENT OF GENERAL AFFAIRS | | | |
|---|---|---|---|
| DEPARTMENT MANAGER | SECTION CHIEF | CHIEF CLERK | REPORTER |
| | | | |

DATE:
DEPARTMENT: _____
DEPARTMENT HEAD (REPORTER): _____
EXTENSION: _____

SIGNATURE

DAMAGE REPORT OF CAR BREAK-IN

| VICTIM EMPLOYEE | NAME | (EXTENSION ) | POSITION | |
|---|---|---|---|---|
| | NAME CODE | | AGE | |
| | CURRENT ADDRESS | | DATE OF JOINING A COMPANY | |
| DATE OF DAMAGE | ( ) BETWEEN : TO : | | | |
| PLACE OF DAMAGE | COMPANY EAST SIDE/SOUTH SIDE PARKING *(PARKING NO. ) | | | |
| DAMAGED CAR | NAME OF CAR | | | |
| | CAR NUMBER | | | |
| | COLOR OF CAR | | | |
| DAMAGE SITUATION | ·DAMAGED POSITIONS, ETC. | | | |
| DAMAGED GOODS | ·STOLEN GOODS, AMOUNT OF DAMAGE, ETC. | | | |
| REPORT TO POLICE | UNREPORTED/REPORTED | | | |
| INSURANCE STATUS | INSURED/UNINSURED | | | |
| DAMAGE PROTECTION PREPARATION, ETC. | PREPARED/UNPREPARED | | | |
| REMARKS | | | | |

*PLEASE REFER TO PARKING MAP

FIG. 3

DATE: NOVEMBER 4, 2008
DEPARTMENT: SYSTEM DEVELOPMENT
DEPARTMENT HEAD (REPORTER): TAKAHIRO IKEHATA
EXTENSION: X-XXX-XXXX

SIGNATURE

| DEPARTMENT OF GENERAL AFFAIRS | | | |
|---|---|---|---|
| DEPARTMENT MANAGER | SECTION CHIEF | CHIEF CLERK | REPORTER |
| | | | |

MONTH DATE ( )  BETWEEN : TO :

DAMAGE REPORT OF CAR BREAK-IN

| VICTIM EMPLOYEE | NAME | RYO ISHISAWA (EXTENSION 6230) | POSITION | MANAGER |
|---|---|---|---|---|
| | NAME CODE | 355297 | AGE | 33 |
| | CURRENT ADDRESS | MINOSHOCHO 492, YAMATOKORIYAMA-SHI | DATE OF JOINING A COMPANY | 4/1/2001 |
| DATE OF DAMAGE | | NOVEMBER 1 (SAT)  BETWEEN 9:00 TO 17:45 | | |
| PLACE OF DAMAGE | | COMPANY  EAST SIDE (SOUTH SIDE)  PARKING *(PARKING NO.5 ) | | |
| DAMAGED CAR | NAME OF CAR | XXX XXX | | |
| | CAR NUMBER | NARA 525 SHI XXXX | | |
| | COLOR OF CAR | WHITE | | |
| DAMAGE SITUATION | | •DAMAGED POSITIONS, ETC.<br><br>PRESENCE OF A TRACE OF PRYING THE DRIVER SIDE DOOR OPEN WITH A CROWBAR OR SOMETHING SIMILAR<br>A SET OF NAVIGATION SYSTEM STOLEN | | |
| DAMAGED GOODS | | •STOLEN GOODS, AMOUNT OF DAMAGE, ETC.<br><br>A SET OF NAVIGATION SYSTEM (¥300,000-) | | |
| REPORT TO POLICE | | UNREPORTED / (REPORTED) | | |
| INSURANCE STATUS | | (INSURED) / UNINSURED | | |
| DAMAGE PROTECTION PREPARATION, ETC. | | (PREPARED) / UNPREPARED | | |
| REMARKS | | | | |

*PLEASE REFER TO PARKING MAP

FIG. 4

DATE: NOVEMBER 4, 2008
DEPARTMENT: SYSTEM DEVELOPMENT
DEPARTMENT HEAD (REPORTER): TAKAHIRO IKEHATA
EXTENSION: X-XXX-XXXX

SIGNATURE

| DEPARTMENT OF GENERAL AFFAIRS | | | |
|---|---|---|---|
| DEPARTMENT MANAGER | SECTION CHIEF | CHIEF CLERK | REPORTER |
| | | | |

MONTH DATE ( ) BETWEEN : TO :

DAMAGE REPORT OF CAR BREAK-IN

| VICTIM EMPLOYEE | NAME | RYO ISHISAWA (EXTENSION 6230) | POSITION | MANAGER |
|---|---|---|---|---|
| | NAME CODE | 355297 | AGE | 33 |
| | CURRENT ADDRESS | MINOSHOCHO 492, YAMATOKORIYAMA-SHI | DATE OF JOINING A COMPANY | 4/1/2001 |
| DATE OF DAMAGE | NOVEMBER 1 (SAT) BETWEEN 9:00 TO 17:45 | | | |
| PLACE OF DAMAGE | COMPANY EAST SIDE/(SOUTH SIDE) PARKING *(PARKING NO.5 ) | | | |
| DAMAGED CAR | NAME OF CAR | XXX XXX | | |
| | CAR NUMBER | NARA 525 SHI XXXX | | |
| | COLOR OF CAR | WHITE | | |
| DAMAGE SITUATION | • DAMAGED POSITIONS, ETC.<br><br>PRESENCE OF A TRACE OF PRYING THE DRIVER SIDE DOOR OPEN WITH A CROWBAR OR SOMETHING SIMILAR<br>A SET OF NAVIGATION SYSTEM STOLEN | | | |
| DAMAGED GOODS | • STOLEN GOODS, AMOUNT OF DAMAGE, ETC.<br><br>A SET OF NAVIGATION SYSTEM (¥300,000-) | | | |
| REPORT TO POLICE | UNREPORTED/(REPORTED) | | | |
| INSURANCE STATUS | (INSURED)/UNINSURED | | | |
| DAMAGE PROTECTION PREPARATION, ETC. | (PREPARED)/UNPREPARED | | | |
| REMARKS | | | | |

*PLEASE REFER TO PARKING MAP

FIG. 5

NOVEMBER 4, 2008
                             DEPARTMENT: SYSTEM DEVELOPMENT
                             DEPARTMENT HEAD (REPORTER): TAKAHIRO IKEHATA
                             EXTENSION    X-XXX-XXXX

DAMAGE REPORT OF CAR BREAK-IN

VICTIM      NAME: RYO ISHISAWA (EXTENSION 6230)     POSITION: MANAGER
EMPLOYEE   NAME CODE: 355297    AGE: 33
              CURRENT ADDRESS: MINOSHOCHO 492, YAMATOKORIYAMA-SHI
              DATE OF JOINING A COMPANY: 4/1/2001
DATE OF DAMAGE: NOVEMBER 1 (SAT)    BETWEEN 9:00 TO 17:45
PLACE OF DAMAGE: COMPANY    EAST SIDE/ SOUTH SIDE      PARKING(*PARKING NO. 5 )

DAMAGED CAR   NAME OF CAR: XXX XXX
                 CAR NUMBER:   NARA 525 SHI XXXX
                 COLOR OF CAR:   WHITE
DAMAGE SITUATION   ·DAMAGED POSITIONS, ETC.

PRESENCE OF A TRACE OF PRYING THE DRIVER SIDE DOOR OPEN
   WITH A CROWBAR OR SOMETHING SIMILAR
   A SET OF NAVIGATION SYSTEM STOLEN

DAMAGED GOODS   ·STOLEN GOODS, AMOUNT OF DAMAGE, ETC.

A SET OF NAVIGATION SYSTEM (¥ 300,000-)
REPORT TO POLICE: UNREPORTED/REPORTED

INSURANCE STATUS: INSURED/UNINSURED
DAMAGE PROTECTION PREPARATION, ETC.: PREPARED/UNPREPARED

REMARKS
* PLEASE REFER TO PARKING MAP

FIG. 7

DATE: NOVEMBER 4, 2008

DEPARTMENT: ███████████

DEPARTMENT HEAD (REPORTER): ███████████ ◯

EXTENSION: ███████████

SIGNATURE

| DEPARTMENT OF GENERAL AFFAIRS | | | |
|---|---|---|---|
| DEPARTMENT MANAGER | SECTION CHIEF | CHIEF CLERK | REPORTER |
|  |  |  |  |

MONTH DATE ( ) BETWEEN : TO :

DAMAGE REPORT OF CAR BREAK-IN

| VICTIM EMPLOYEE | NAME | ███████ (EXTENSION ███) | POSITION | ███████ |
|---|---|---|---|---|
| | NAME CODE | ███████ | AGE | █ |
| | CURRENT ADDRESS | ███████ | DATE OF JOINING A COMPANY | ███████ |
| DATE OF DAMAGE | NOVEMBER 1 (SAT) BETWEEN 9:00 TO 17:45 | | | |
| PLACE OF DAMAGE | COMPANY EAST SIDE/(SOUTH SIDE) PARKING *(PARKING NO. ■) | | | |
| DAMAGED CAR | NAME OF CAR | XXX XXX | | |
| | CAR NUMBER | ███████ | | |
| | COLOR OF CAR | WHITE | | |
| DAMAGE SITUATION | • DAMAGED POSITIONS, ETC.<br><br>PRESENCE OF A TRACE OF PRYING THE DRIVER SIDE DOOR OPEN WITH A CROWBAR OR SOMETHING SIMILAR<br>A SET OF NAVIGATION SYSTEM STOLEN | | | |
| DAMAGED GOODS | • STOLEN GOODS, AMOUNT OF DAMAGE, ETC.<br><br>A SET OF NAVIGATION SYSTEM (¥300,000-) | | | |
| REPORT TO POLICE | UNREPORTED/(REPORTED) | | | |
| INSURANCE STATUS | (INSURED)/UNINSURED | | | |
| DAMAGE PROTECTION PREPARATION, ETC. | (PREPARED)/UNPREPARED | | | |
| REMARKS | | | | |

*PLEASE REFER TO PARKING MAP

| DEPARTMENT OF GENERAL AFFAIRS | | | |
|---|---|---|---|
| DEPARTMENT MANAGER | SECTION CHIEF | CHIEF CLERK | REPORTER |

202 DATE:

DEPARTMENT:
DEPARTMENT HEAD (REPORTER)                    ○
EXTENSION
                                          ↑
                                    SIGNATURE

DAMAGE REPORT OF CAR BREAK-IN

| VICTIM EMPLOYEE | NAME | (EXTENSION      ) | POSITION | |
|---|---|---|---|---|
| | NAME CODE | | AGE | |
| | CURRENT ADDRESS | | DATE OF JOINING A COMPANY | |
| DATE OF DAMAGE | ( ) BETWEEN   :   TO   : | | | |
| PLACE OF DAMAGE | COMPANY  EAST SIDE/SOUTH SIDE      PARKING *(PARKING NO.    ) | | | |
| DAMAGED CAR | NAME OF CAR | | | |
| | CAR NUMBER | | | |
| | COLOR OF CAR | | | |
| DAMAGE SITUATION | •DAMAGED POSITIONS, ETC. | | | |
| DAMAGED GOODS | •STOLEN GOODS, AMOUNT OF DAMAGE, ETC. | | | |
| REPORT TO POLICE | UNREPORTED/REPORTED | | | |
| INSURANCE STATUS | INSURED/UNINSURED | | | |
| DAMAGE PROTECTION PREPARATION, ETC. | PREPARED/UNPREPARED | | | |
| REMARKS | | | | |

203
204
205

*PLEASE REFER TO PARKING MAP

FIG. 10

NOVEMBER 4, 2008
DEPARTMENT: SYSTEM DEVELOPMENT
DEPARTMENT HEAD (REPORTER): TAKAHIRO IKEHATA
EXTENSION X-XXX-XXXX

DAMAGE REPORT/OF CAR BREAK-IN 201

VICTIM       NAME: RYO ISHISAWA (EXTENSION 6230)    POSITION: MANAGER
EMPLOYEE  NAME CODE: 355297   AGE: 33                                                    EMBEDDING PROHIBITED
202  201    CURRENT ADDRESS: MINOSHOCHO 492, YAMATOKORIYAMA-SHI
              DATE OF JOINING A COMPANY: 4/1/2001
DATE OF DAMAGE: NOVEMBER 1 (SAT)  BETWEEN 9:00 TO 17:45
PLACE OF DAMAGE: COMPANY  EAST SIDE/ SOUTH SIDE    PARKING(*PARKING NO. 5)
              202
DAMAGED CAR  NAME OF CAR: XXX XXX
    202          CAR NUMBER:  NARA 525 SHI XXXX              EMBEDDING PROHIBITED
         201    COLOR OF CAR:  WHITE
DAMAGE SITUATION  •DAMAGED POSITIONS, ETC.

PRESENCE OF A TRACE OF PRYING THE DRIVER SIDE DOOR OPEN
  WITH A CROWBAR OR SOMETHING SIMILAR
202 A SET OF NAVIGATION SYSTEM STOLEN

DAMAGED GOODS  •STOLEN GOODS, AMOUNT OF DAMAGE, ETC.

A SET OF NAVIGATION SYSTEM (¥ 300,000-)
REPORT TO POLICE: UNREPORTED/REPORTED
                          202
INSURANCE STATUS: INSURED/UNINSURED
DAMAGE PROTECTION PREPARATION ETC.: PREPARED/UNPREPARED

REMARKS — 202          202
* PLEASE REFER TO PARKING MAP

IMAGE PROCESSING APPARATUS AND SCANNER APPARATUS

CROSS-NOTING PARAGRAPH

This non-provisional application claims priority under 35 U.S.C. §119(a) on Patent Application No. 2009-027073 filed in JAPAN on Feb. 9, 2009, the entire contents of which are hereby incorporated herein by reference.

FIELD OF THE INVENTION

The present invention relates to an image processing apparatus and a scanner apparatus, and more particularly to an image forming apparatus and a scanner apparatus for applying OCR (Optical Character Reader) processing to original image data.

BACKGROUND OF THE INVENTION

Some conventional scanner apparatuses apply OCR processing to original image data obtained by scanning, which result is embedded in original image data as transparent character data, and an electronic document is thereby obtained in order to improve convenience, retrieval performance in particular, for a scan result. By performing such processing, transparent character data (text data) is embedded for original image data scanned as an image, and the transparent character data enables text retrieval.

By using such an electronic document in which the transparent character data is embedded, when a user views the electronic document by displaying or printing, only the scanned original image data is viewed, therefore the user is not annoyed, and since the transparent character data subjected to an OCR conversion is embedded in the original image data, retrieval processing is possible by using the character data.

Related to a technology according to character recognition processing by OCR processing of image data, for example, in a technology disclosed in Japanese Laid-Open Patent Publication No. 10-232904, a predetermined format is printed on a ledger sheet, and a character to be an object of character recognition is written, then a stop mark is written at the end of a range required for recognition processing when performing character recognition. In a character recognition apparatus, unnecessary processing is not performed for a blank part by performing character recognition processing in a range up to a position at which the stop mark is displayed.

As described above, processing for embedding of transparent character data for original image data is convenient since retrieval performance for the original image data is improved. However, on the other hand, since the transparent character data is embedded in the original image data before the user is aware thereof, there is also an aspect of possibly becoming a cause of information leakage unintended by the user. For example, when the user performs masking processing on a part of original image data in order to protect information for an electronic document comprised of original image data in which transparent character data is embedded, description contents of the masked part can be leaked from the embedded transparent character data in a case where deletion of transparent character data is not performed at the time of masking.

Additionally, since the transparent character data is utilized mainly for the purpose of a keyword search, it easily becomes an object to be searched by a keyword search system. Accordingly, even though searching is impossible in the case of mere original image data, easy search becomes possible with the transparent character data when a malicious searcher attempts to obtain confidential information such as personal information.

In Japanese Laid-Open Patent Publication No. 10-232904, although unnecessary character recognition processing is attempted to be suppressed by writing a stop mark in an original, nothing is mentioned on a problem of information leakage due to transparent character data embedded in original image data as described above.

SUMMARY OF THE INVENTION

An object of the present invention is to provide an image processing apparatus capable of reducing a risk of information leakage without losing an operability of a user by controlling an embedding range of transparent character data in accordance with a form of an original, and a scanner apparatus provided with the image forming apparatus.

It is another object of the present invention to provide an image processing apparatus for processing input original image data, comprising: an OCR processing portion for performing OCR processing on original image data and performing character recognition of the original image data; a transparent character embedding portion for embedding character data recognized by the OCR processing portion as transparent character data in the original image data; a control portion for controlling a range in which transparent character data is embedded by the transparent character embedding portion; and an output portion for outputting electronic document data comprised of image data in which transparent character data is embedded by the transparent character embedding portion.

It is another object of the present invention to provide the image processing apparatus having a form recognition portion for recognizing a form of input original image data, wherein the control portion controls a range in which the transparent character data is embedded based on a recognition result of a form recognized by the form recognition portion.

It is another object of the present invention to provide the image processing apparatus, wherein a control of a range in which the transparent character data is embedded, is a control for prohibiting the OCR processing for a specific range of the original image data and for prohibiting embedding of transparent character data for the specific range.

It is another object of the present invention to provide the image processing apparatus, wherein a control of a range in which the transparent character data is embedded, is a control for prohibiting transparent character data in a specific range from being embedded among original image data for which character recognition is performed by the OCR processing portion.

It is another object of the present invention to provide the image processing apparatus, wherein the specific range is an entire region of the original image data.

It is another object of the present invention to provide the image processing apparatus, wherein the specific range is a specific range predetermined corresponding to a form recognized by the form recognition portion.

It is another object of the present invention to provide a scanner apparatus having the image processing apparatus and a scanner portion for reading an original and generating original image data, wherein original image data generated by the scanner portion is processed by the image processing apparatus.

It is another object of the present invention to provide the scanner apparatus, wherein character data recognized by the OCR processing portion of the image processing apparatus is prohibited from being transmitted to outside of the scanner apparatus.

It is another object of the present invention to provide the scanner apparatus comprising: a display portion for displaying character data recognized by the OCR processing portion; and an operation portion for receiving an operation input to specify a range that transparent character data is embedded in original image data, wherein the transparent character embedding portion embeds character data recognized by the OCR processing portion as transparent character data based on a range specified by the operation portion.

It is another object of the present invention to provide the scanner apparatus, wherein among character data recognized by the OCR processing portion, character data corresponding to specified character which is prohibited from embedding is not embedded in the original image data as at least transparent character data.

BRIEF DESCRIPTION OF THE DRAWINGS

FIG. 1 is a block diagram for showing an exemplary configuration of a scanner apparatus to which the present invention is applied, and is the diagram for showing a multi-functional peripheral having a scanner function as an example;

FIG. 2 is a diagram for showing an example of an original to be read by a multi-functional peripheral;

FIG. 3 is a diagram for showing an example of an original in which a user performs writing for form data in FIG. 2;

FIG. 4 is a diagram for showing electronic document data at the time of digitizing the written data shown in FIG. 3 read by a scanner apparatus;

FIG. 5 is a diagram for showing transparent character data embedded in the electronic document data of FIG. 4;

FIG. 7 is a diagram for showing an example in which a description part of personal information of the electronic document data shown in FIG. 4 is processed;

FIG. 8 is a diagram for explaining an example of form data to be held in advance by a multi-functional peripheral or the like;

FIG. 10 is a diagram for further explaining another embodiment of the scanner apparatus according to the present invention.

PREFERRED EMBODIMENTS OF THE INVENTION

Figure 6:
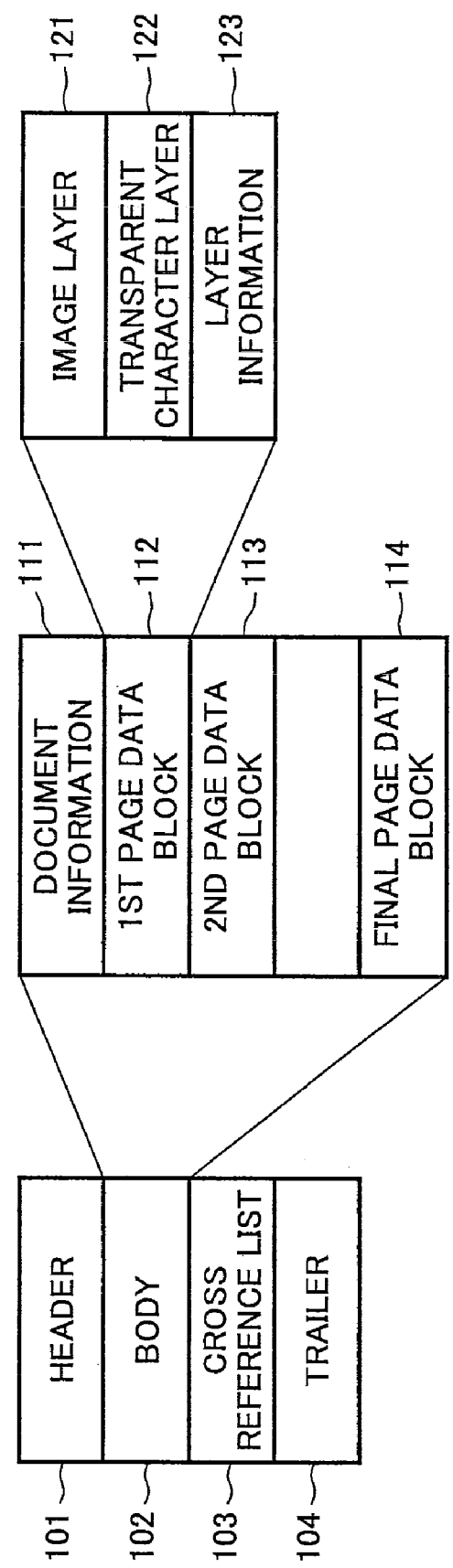
FIG. 6 is a diagram for explaining data structure of an electronic document in which transparent character data is embedded.

FIG. 1 is a block diagram for showing an exemplary configuration of a scanner apparatus to which the present invention is applied and illustrates a multi-functional peripheral having a scanner function as an example. A multi-functional peripheral 1 is to configure an embodiment of the image processing apparatus and the scanner apparatus of the present invention. Here, the image processing apparatus of the present invention is one which does not require a scanner function as an essential configuration requirement, and the scanner apparatus of the present invention is configured to be provided with a scanner function (equivalent to a following image reading portion 11) in addition to the above image processing apparatus. Accordingly, the multi-functional peripheral 1 is an embodiment of the scanner apparatus of the present invention, at the same time, functions as an embodiment of the image processing apparatus of the present invention. The image processing apparatus has a configuration to input original image data read by a scanner and perform image processing.

Hereinafter, as an embodiment of the present invention, although a multi-functional peripheral is explained as an example, without being limited to the multi-functional peripheral in the present invention, the present invention can be applied to an image processing apparatus provided with an OCR function, and a scanner apparatus provided with a scanner function in addition to the OCR function.

The multi-functional peripheral 1 is provided with a device control portion 14 comprised of a CPU that performs a calculation, a RAM that stores temporary information involved in the calculation, and the like. A ROM that stores various programs such as a control program for controlling the multi-functional peripheral 1 is included in the device control portion 14. A management portion 17, which is a memory that stores management information (various pieces of control information including an address book and a list of saving destinations) for managing processing performed by the multi-functional peripheral 1, is connected to the device control portion 14.

Furthermore, an image reading portion 11 which reads an image recorded on recording paper and generates image data is connected to the device control portion 14. In the image reading portion 11, a CCD 11a for loading an image of an original placed on an original glass or sent by an ADF (auto document feeder) as image data, and an original detecting sensor 11b for detecting presence/absence of an original are provided.

Additionally, an image forming portion 13 that forms image data on recording paper is connected to the device control portion 14. In the image forming portion 13, a memory 13a that stores image data temporarily, a printing portion (LSU, for example) 13b that forms an image from image data stored by the memory 13a to record on recording paper, and trays for paper feeding (a first paper feed tray 13c, a second paper feed tray 13d) are provided. Then, the multi-functional peripheral 1 once stores the image data generated by the image reading portion 11 in the memory 13a, thereafter forms an image by the printing portion 13b. In this manner, the multi-functional peripheral 1 functions as a copier.

Furthermore, a FAX modem 18 that performs facsimile communication is connected to the device control portion 14. The FAX modem 18 is connected to a telephone line network N3. The multi-functional peripheral 1 is capable of transmitting image data generated by the image reading portion 11 to other facsimile apparatus 4 through the telephone line network N3. Additionally, the multi-functional peripheral 1 receives image data at a FAX modem 18, which is transmitted from other facsimile apparatus 4 through the telephone line network N3, and is capable of forming an image in the image forming portion 13 from the received image data. In this manner, the multi-functional peripheral functions as a facsimile apparatus.

Furthermore, a communication portion 15 for the multi-functional peripheral to transmit and receive information to and from the outside is connected to the device control portion 14. The communication portion 15 is connectable to a communication network N1 such as an in-house LAN, and one or a plurality of PCs 5 is connectable to the communication network N1. In a normal state in which the multi-functional peripheral 1 is solely operated, the communication portion 15 is connected to the communication network N1 and exchanges information with the PC 5 through the communication network N1.

The multi-functional peripheral 1 is able to transmit image data generated by the image reading portion 11 from the communication portion 15 to the PC 5. In this manner, the multi-functional peripheral 1 functions as a scanner apparatus with a file transmitting function (file transfer apparatus).

An HD (Hard Disc) 16 is connected to the device control portion 14. The HD 16 stores, for example, image data concerning image processing such as image data generated by the image reading portion 11. The multi-functional peripheral 1 functions as an electronic filing apparatus and also stores the image data generated by the image reading portion 11 in the HD 16 as a file. Furthermore, an erasing portion 19 is connected to the device control portion 14. The erasing portion 19 erases data recorded and held in the HD 16 according to a control of the device control portion 14.

Furthermore, the multi-functional peripheral 1 receives image data transmitted from the PC 5 at the communication portion 15, and is able to form an image from the received image data at the image forming portion 13. In this manner, the multi-functional peripheral 1 functions as a printing apparatus (printer).

The communication network N1 is further connected to a wide area communication network N2 such as an internet network. The communication portion 15 is able to receive image data between an internet facsimile apparatus 2 and an external PC 3 connected to the wide area communication network N2 through the communication network N1 and the wide area communication network N2. In this manner, the multi-functional peripheral 1 functions as an internet facsimile apparatus or an electronic mail transmitting apparatus.

Furthermore, an operation portion 12 that receives an operation including specification of a save destination from a user, is connected to the device control portion 14. The operation portion 12 has an input portion 12a such as a touch panel or numeric keypad to which information such as a control command by operation of a user is input, and a display portion 12b such as a liquid crystal panel that displays information required for operation.

The multi-functional peripheral 1 having the above described configuration has an OCR processing portion that recognizes characters of original image data read at the image reading portion 11 or original image data input to the multi-functional peripheral 1 from an external device or the like, and a transparent character embedding portion that embeds character data recognized at the OCR processing portion as transparent character data. The OCR processing portion obtains character (text) data by applying OCR processing for original image data read at the image reading portion 11 or stored in the memory 13a after inputting to the multi-functional peripheral 1 from an external device, and is realized by control processing of the device control portion 14. Furthermore, concerning the processing to embed the character data recognized in the OCR processing as the transparent character data is also realized in the control processing of the device control portion 14. The printing portion 13b corresponds to an output portion of the present invention that outputs electronic document data comprised of image data where the transparent character data is embedded.

The device control portion 14 controls a range of transparent character that is to be embedded as the transparent character data among the character data recognized in the OCR processing, thereby reducing a risk of information leakage is achieved without losing operability of a user. Here, the device control portion 14 has a form recognition function that recognizes a form of original image data. To recognize the form of original image data, a predetermined form (format) data is stored beforehand in a memory incorporated in the device control portion 14 or other storing means (such as HD 16), and in the device control portion 14, the form of original image data temporarily stored in the memory 13a is compared with the form data to determine whether the original image data corresponds to the predetermined form. That is, the device control portion 14 functions as a form recognition portion of the present invention.

Then the device control portion 14 controls a range in which transparent character data is embedded based on a recognition result of a form. Specifically, as control of the range in which transparent character data is embedded, OCR processing is prohibited for a specific range of original image data, and embedding transparent character data for the specific range is prohibited. Alternatively, among character data recognized in the OCR processing, a control for prohibiting character data as transparent character data from being embedded in a specific range may be performed. Then the specific range when performing the control may be an entire region of the original image data, or may be a specific range that is predetermined corresponding to the recognized form. Furthermore, the original image data obtained by scanning is displayed on the display portion and the range in which transparent character data is prohibited from being embedded may be specified by a user operation. Alternatively, predetermined prohibited character data may not be embedded as the transparent character data from the character data recognized in the OCR processing.

Thereby, it is possible to avoid a situation in a conventional example that transparent character data is embedded in the original image data though original image data is processed so as to be seemingly invisible. Furthermore, as a secondary effect, processing amount of OCR can be reduced by prohibiting the OCR itself.

FIG. 2 is a diagram for showing an example of an original to be read by the multi-functional peripheral 1. An original shown in FIG. 2 is form (format) data that has been registered inside the multi-functional peripheral 1 in advance, and a user is able to write for the form data appropriately. Note that, the form data may be, not only a form that is held inside the multi-functional peripheral 1, but also the one that is held in an external memory or a storage apparatus and is accessible from the multi-functional peripheral 1 as appropriate.

In this example, form data created as "Damage report of car break-in" is shown. A user takes out to print the "Damage report of car break-in" out of the multi-functional peripheral 1, other external device, a memory, or the like (hereinafter, simply referred to as the multi-functional peripheral 1), and is able to complete an original version of "Damage report of car break-in" by filling up the printed one appropriately. Alternatively, writing is performed electronically by using a PC or the like for the form data held in the multi-functional peripheral 1, and the damage report of car break-in can be created. By printing the written data, the original of the damage report of car break-in is obtained.

FIG. 3 is a diagram for showing an example of an original in which a user performed writing for form data in FIG. 2. As illustrated, in this example of the "Damage report of car break-in", information with which an individual can be identified is included, such as the name and address of the victim, and the car number of the damaged car.

FIG. 4 is a diagram for showing electronic document data at the time of digitizing the written original shown in FIG. 3 read by a scanner. When reading the written original shown in FIG. 3 by the conventional scanner and digitizing it, electronic document data shown in FIG. 4 is obtained. Here, although it is not existed visibly in FIG. 4, in the electronic document data of FIG. 4, an OCR result shown in FIG. 5 is embedded in a form of transparent character data. The transparent character data of FIG. 5 is character (text) data generated by reading the written original shown in FIG. 3 by a scanner apparatus and applying OCR processing to the obtained original image data. The character data is embedded in the original image data in a format of transparent character data. The embedding of transparent character data is performed at the time of generating electronic document data by scanning an original by a scanner.

FIG. 6 is a diagram for explaining data structure of an electronic document in which transparent character data is embedded. Each of items shown in FIG. 6 is explained below.

Header 101 contains a string of characters that shows the file format of electronic document data and the version number. In a body 102, information to be displayed and page information are described. A cross-reference list 103 is described as a cross-reference table, and the number of a sub-section and its address (bite number from the top of the file) are described. Additionally, a trailer 104 is one in which the summary of the file is described and a size and a position of a header are indicated.

In document information 111 included in the body 102, data showing a position of each page or the like is stored. Furthermore, in a n-th page data block (including $1^{st}$ page data block 112, $2^{nd}$ page data block 113, . . . final page data block 114) included in the body 102, data for each page is stored.

The data block of each page includes an image layer 121, a transparent character layer 122 and layer information 123. The image layer 121 is a layer comprised of scanned image data. In addition, the transparent image layer 122 is a layer comprised of a transparent character object. The layer information 123 records the sheet number and types of layer and the like.

As shown in FIG. 6, transparent character data obtained by performing OCR processing to original image data generated by a scanner is stored independently in the transparent character layer 122 which is different from the image layer 121 including original image data. Accordingly, at the time of disclosing the contents of the electronic document data shown in FIG. 4, the information to be protected is leaked from the transparent character data in a case where the contents of FIG. 5 remains embedded as transparent character data, even if the description part of the personal information is processed, for example, by masking as shown in FIG. 7 to keep the personal information confidential.

In an embodiment according to the present invention, in order to suppress the leakage of information as described above, a region in which information to be protected is written is predetermined for form data held in advance in the multi-functional peripheral 1 or the like, and when an original with the form data printed in is read by a scanner, transparent character data is not to be formed in the region in which information to be protected is written.

In this case, the form data held by the multi-functional peripheral 1 or the like and the form of original image data read by a scanner are compared and in a case of recognizing that an original in the same form as the form data held by the multi-functional peripheral 1 or the like is read, when a specific range to be protected is set in the form data, transparent character data is not to be formed in the specific range.

The specific range may be set as the entire original image data. That is, in the case of original image data having a form that corresponds to the form data held by the multi-functional peripheral 1 or the like, the embedding of transparent character data is not to be performed to the original image data.

Additionally, in another example, as a specific range described above, a predetermined specific range corresponding to the form data held by the multi-functional peripheral 1 or the like may be applied. That is, in the case of original image data having a form that corresponds to the form data held by the multi-functional peripheral 1 or the like, the embedding of transparent character data is not to be performed to the predetermined specific range corresponding to the form data.

Hereinafter, an outline of embodiments of original scanning and post processing according to the present invention are explained. First, an original scanned by a scanner apparatus is recognized whether or not an original is described in the predetermined form in the processing of comparison with the form data held by the multi-functional peripheral 1 or the like. Here, as an example, it is assumed that scanning of an original of the form of FIG. 2 is recognized.

FIG. 8 is a diagram for explaining an example of form data held in advance in a multi-functional peripheral 1 or the like. In an embodiment according to the present invention, in form data held in advance in a multi-functional peripheral 1 or the like, information as to which region of an attribute field of the form information to be protected is described, is also input. In the case of this example of "Damage report of car break-in", for a stamping column for approval 201, a column to write a department head (reporter) and its department 202, a column to write victim information 203, a column to write a parking number of the place of damage 204, and a column to write the damaged car number 205, information indicative of being the region in which information to be protected is written is input and held in the form data.

Based on the above information, in an embodiment according to the present invention, OCR processing and a range in which transparent character data is embedded are controlled. Here, for a region that has been registered in advance as a region required for protection at least in a form, OCR processing and the operation for embedding the transparent character data are prohibited. Thereby, it is possible to avoid a situation that transparent character data is embedded though it is processed so as to be seemingly invisible in the conventional example. Furthermore, as a secondary effect, processing amount of the OCR can be reduced by prohibiting the OCR itself. This example is an example of a case where a specific range in which OCR processing and embedding transparent character data is prohibited is a specific range that has been predetermined corresponding to the form.

Figure 9:
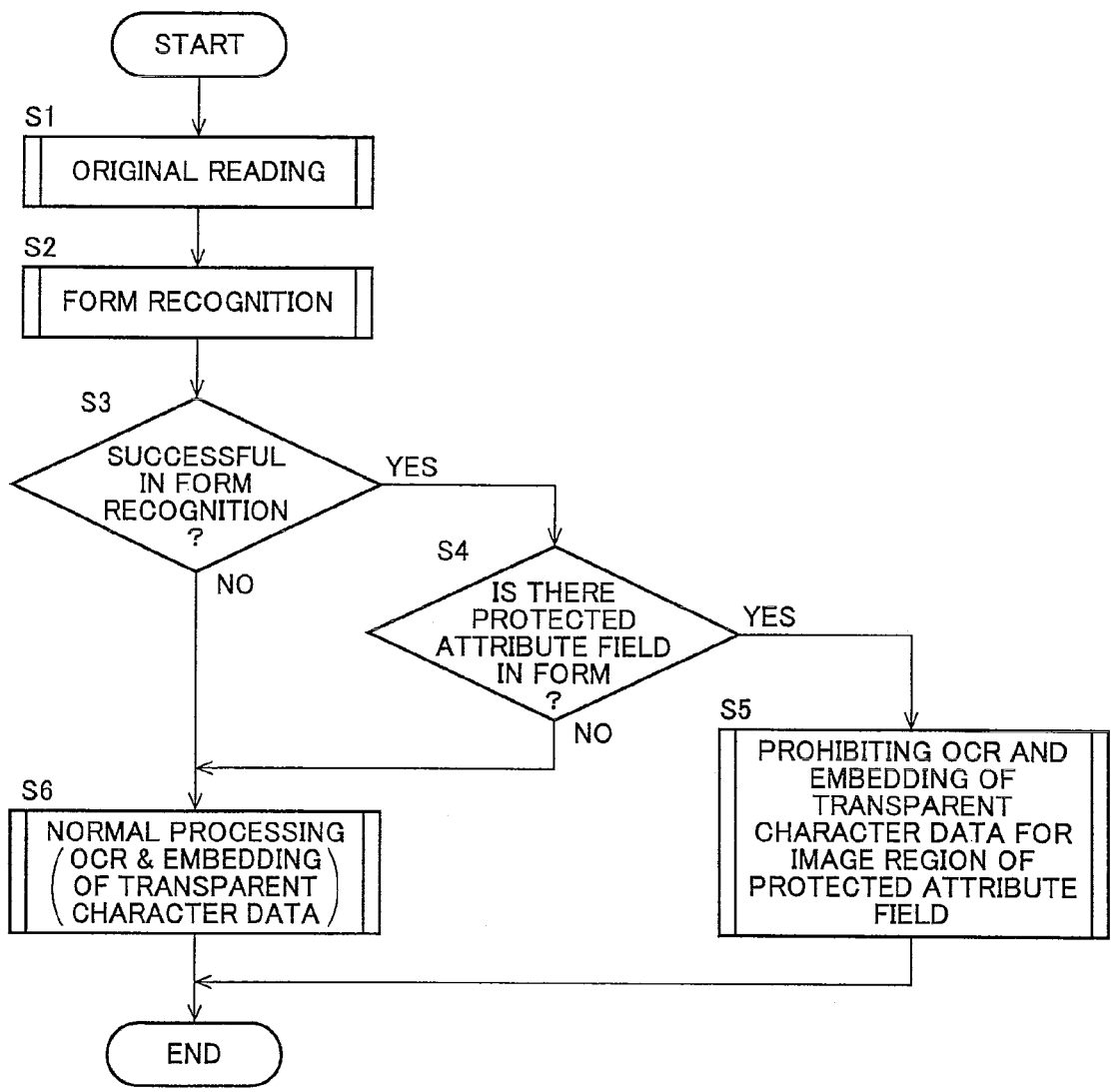
FIG. 9 is a flowchart for explaining an example of scan processing of an original by the scanner apparatus according to the present invention and is a diagram for showing an exemplary processing of the scanner apparatus configured as a multi-functional peripheral.

FIG. 9 is a flowchart for explaining an example of scan processing of an original by a scanner apparatus according to the present invention and shows an exemplary processing of the scanner apparatus configured as the multi-functional peripheral 1 described above.

In the multi-functional peripheral 1, an original reading operation is performed according to an original reading instruction from a user (step S1). Then in the multi-functional peripheral 1, a form recognition processing is performed based on the read original image data (step S2). Here, the multi-functional peripheral 1 compares the read original image data with form data held in the multi-functional peripheral 1 or the like and determines whether there is correspondence. Note that, the original image data to be compared with the form data may be, not only image data read by a scanner (image reading portion) of the multi-functional peripheral 1, but image data input from an external device, an external memory, or the like.

Then in the multi-functional peripheral 1, as a result of comparing the original image data with the form data, there is no forms that correspond to each other and in the case of not successful in the form recognition (step S3-No), normal processing, that is, OCR processing is performed for the entire region of read or input original image data, and an OCR result is embedded in the original image data as transparent character data, and electronic document data is obtained (step S6).

On the other hand, in a case where some of the read original image data corresponds to some of the form data held in a scanner apparatus or the like and the multi-functional peripheral 1 determines that the form recognition is successful (step S3-Yes), it further determines whether or not there is a field in which protected attribute is set in the form data for which the form recognition is successful (step S4). Here, when there is no field in which the protected attribute is set, the process is proceeded to step S6 and the normal processing as described above is executed.

Furthermore, when there is a field in which protected attribute is set in the form data for which the form recognition is successful, transparent character data is prohibited from being embedded in an image region of the protected attribute field, and embedding transparent character data is performed for only other regions in which protected attribute is not set (step S5).

Note that, in the above example, when applying the entire region of original image data as a specific range in which embedding transparent character data is prohibited, OCR processing and processing for embedding transparent character data may be prohibited for such original image data, when the form recognition is successful at the above described step S3.

(Other Embodiment)

As other embodiment of the present invention, when OCR processing is executed for original image data read by the multi-functional peripheral 1 or input from the outside and transparent character data is embedded in the processed image data, OCR processing is applied to the entire image data even though there is an image region in which protected attribute is set, and only embedding transparent character data is restricted for the field in which protected attribute is set, and use for a specific purpose may be permitted for the character data subjected to character recognition in OCR processing. Here, when the use of the character data subjected to character recognition in OCR processing is restricted in the multi-functional peripheral 1, there is a case of hampering the convenience of the OCR function equipped in the multi-functional peripheral 1, and therefore it makes possible to use the character data obtained in the OCR processing for the specific purpose.

For example, when displaying character data recognized in the OCR processing, or when searching character data recognized in the OCR processing, use of the character data obtained in the OCR processing is permitted for the field region in which protected attribute is set. This example is an example of a case where the specific range of prohibiting transparent character data from being embedded is the specific range that has been predetermined corresponding to the form.

In addition, when it is recognized that the form of the original image data corresponds to the predetermined form data, embedding transparent character data for the original image data may be totally prohibited while executing OCR processing to the original image data. This example is an example of a case where the specific range in which transparent character data is prohibited from being embedded is the entire region of original image data.

Additionally, in an embodiment of a scanner apparatus according to the present invention, transmitting character data recognized in the OCR processing to the outside of the scanner apparatus may be prohibited. That is, the multi-functional peripheral 1 which is one embodiment of the scanner apparatus as described above may allow character data obtained in the OCR processing to be usable under predetermined conditions, even when embedding transparent character data is prohibited in a specific range. At this time, as described above, while permitting a display of character data obtained in OCR processing and a search using the character data, transmitting character data obtained in the OCR processing to the outside of the multi-functional peripheral 1 is at least prohibited. Thereby, use of character data obtained in OCR processing is possible while avoiding the risk of information leakage to the outside.

Furthermore, in other embodiment of the scanner apparatus according to the present invention, it makes possible that a user specifies a range in original image data where transparent character data is embedded by displaying character data recognized in OCR processing so that a user is able to confirm, and thereby, character data in the specified range may be embedded in original image data as transparent character data. Alternatively, character data in the specified range may be prohibited from being embedded in the original image data as transparent character data.

For example, in reading and digitizing the written original shown in FIG. 3 by a scanner, the read written original image data is displayed by the multi-functional peripheral 1. A display destination of the read image at this time may be an information processing apparatus such as a PC connected through a network. A user then confirms the display of the original image data, and specifies the region where transparent data is embedded by performing operation input using the operation portion 12 or the like. This specified region corresponds to a specific range for controlling a range in which transparent character data is embedded. Contrary to this, the device control portion 14 prohibits OCR processing except in the specified region, performs OCR processing for the specified region, embeds the obtained character data in the transparent character data and generates electronic document.

In the example above, although OCR is applied for the region specified by a user and transparent character data is embedded in the specified region, OCR processing for the region specified by the user may be prohibited. In this manner, transparent character data may not be embedded in the region specified by the user.

Further, in the above example, also for a region in which embedding transparent character data is not performed, only the OCR processing is permitted and character data obtained in the OCR processing may be used.

In such processing, information leakage is prevented without fail by displaying image data read by a scanner and making a user to recognize a text part that should not be leaked.

FIG. 10 is a diagram for further explaining another embodiment of the scanner apparatus according to the present invention. In this embodiment, character data specified as a specific key word from the character data recognized in OCR processing is set as an embedding prohibited character. Thereby, when there is an embedding prohibited character that has been previously set within the character data read by a scanner and recognized by OCR, the embedding prohibited character is at least not to be embedded in original image data as transparent character data.

In this embodiment, when an original is read by a scanner and digitized, in the multi-functional peripheral 1, OCR processing is applied for the read written original image data, and the obtained character data are compared with embedding prohibited character prepared in advance. Then, when the character data obtained in the OCR processing corresponds to the embedding prohibited character, embedding the character data in original image as transparent character data is prohibited. Embedding prohibited character data is stored and held in advance in storing means that is accessible by the device control portion 14 such as a memory 13a or an HD 16.

On decision of a specific range that prohibits embedding transparent character data, together with the above prohibited character data, permitted character data that permits embedding transparent character data is prepared in advance, and may be stored in storing means.

For example, as a result of reading the written original shown in FIG. 3 and performing OCR processing, character data shown in FIG. 10 is obtained. At this time, the device control portion 14 of the multi-functional peripheral 1 compares character data obtained in the OCR processing with prohibited character data and permitted character data stored in the predetermined storage means.

In this example, as a prohibited key word 201, "name", "position", "name code", "age", "present address", "date of joining a company", and "damaged car" are picked out as key words indicative of personal information. In addition, as a permission keyword 202 at this time, keywords indicative of not personal information such as "date of damage", "place of damage", "damage situation", "damaged goods" are detected.

In this case, character data obtained in the OCR processing is searched from the first, and a range of character data extending from the point where the prohibited keyword 201 is detected to the following point where the permitted keyword 202 is detected is regarded as a specific range and embedding transparent character data is prohibited. Next, embedding transparent character data is permitted for a range of character data extending from the point where the permitted keyword 202 to the following point where the prohibited keyword 201 is detected. By performing such processing, it is possible to prevent personal information from being carelessly embedded as transparent character data.

According to the present invention, an image processing apparatus that is able to reduce the risk of information leakage without losing operability of a user and a scanner apparatus provided with the image processing apparatus can be provided by controlling a range in which transparent character data is embedded in accordance with a form of an original.

Especially, according to the present invention, in a case where original image data is determined to have a specific form when form recognition is performed for the original image data, the risk of information leakage caused by embedding transparent character data is reduced by prohibiting transparent character data from being embedded in the entire range of the original image data, or prohibiting transparent character data from being embedded in a specific range of original image data. In addition, it is possible to reduce the amount of the OCR processing by controlling OCR processing range in accordance with an original form.

Further, according to the present invention, the user is able to confirm the character part that information should not be leaked by displaying recognized character data so that a user is able to confirm that and enabling the user to specify a range of embedding in original image data as transparent character data, and thereby the information leakage can be prevented without fail.

Additionally, it is possible to prevent personal information from being carelessly embedded as transparent character data by making the predetermined prohibited character data not to be embedded as transparent character data from the recognized character data.

The invention claimed is:

1. An image processing apparatus for processing input original image data, comprising:
    an OCR processing portion for performing OCR processing on original image data and performing character recognition of the original image data;
    a transparent character embedding portion for embedding character data recognized by the OCR processing portion as transparent character data in the original image data;
    a control portion for controlling a range in which transparent character data is embedded by the transparent character embedding portion; and
    an output portion for outputting electronic document data comprised of image data in which transparent character data is embedded by the transparent character embedding portion.

2. The image processing apparatus as defined in claim 1 having a form recognition portion for recognizing a form of input original image data, wherein
    the control portion controls a range in which the transparent character data is embedded based on a recognition result of a form recognized by the form recognition portion.

3. The image processing apparatus as defined in claim 2, wherein
    a control of a range in which the transparent character data is embedded, is a control for prohibiting the OCR processing for a specific range of the original image data and for prohibiting embedding of transparent character data for the specific range.

4. The image processing apparatus as defined in claim 3, wherein
    the specific range is an entire region of the original image data.

5. The image processing apparatus as defined in claim 3, wherein
    the specific range is a specific range predetermined corresponding to a form recognized by the form recognition portion.

6. A scanner apparatus having the image processing apparatus as defined in claim 3 and a scanner portion for reading an original and generating original image data, wherein
    original image data generated by the scanner portion is processed by the image processing apparatus.

7. The image processing apparatus as defined in claim 2, wherein
    a control of a range in which the transparent character data is embedded, is a control for prohibiting transparent character data in a specific range from being embedded among original image data for which character recognition is performed by the OCR processing portion.

8. The image processing apparatus as defined in claim 7, wherein
    the specific range is an entire region of the original image data.

9. The image processing apparatus as defined in claim 7, wherein
    the specific range is a specific range predetermined corresponding to a form recognized by the form recognition portion.

10. A scanner apparatus having the image processing apparatus as defined in claim 7 and a scanner portion for reading an original and generating original image data, wherein original image data generated by the scanner portion is processed by the image processing apparatus.

11. A scanner apparatus having the image processing apparatus as defined in claim 2 and a scanner portion for reading an original and generating original image data, wherein
original image data generated by the scanner portion is processed by the image processing apparatus.

12. A scanner apparatus having the image processing apparatus as defined in claim 1 and a scanner portion for reading an original and generating original image data, wherein
original image data generated by the scanner portion is processed by the image processing apparatus.

13. The scanner apparatus as defined in claim 12, wherein the scanner apparatus, wherein character data recognized by the OCR processing portion of the image processing apparatus is prohibited from being transmitted to outside of the scanner apparatus.

14. The scanner apparatus as defined in claim 1 comprising:
a display portion for displaying character data recognized by the OCR processing portion; and an operation portion for receiving an operation input to specify a range that transparent character data is embedded in original image data, wherein
the transparent character embedding portion embeds character data recognized by the OCR processing portion as transparent character data based on a range specified by the operation portion.

15. The scanner apparatus as defined in claim 1, wherein among character data recognized by the OCR processing portion, character data corresponding to specified character which is prohibited from embedding is not embedded in the original image data as at least transparent character data.

* * * * *